United States Patent [19] [11] 4,149,032

Peters [45] Apr. 10, 1979

[54] PRIORITY MIXER CONTROL

[75] Inventor: Richard W. Peters, Algonquin, Ill.

[73] Assignee: Industrial Research Products, Inc., Elk Grove Village, Ill.

[21] Appl. No.: 902,675

[22] Filed: May 4, 1978

[51] Int. Cl.$^2$ .............................................. H04M 3/56

[52] U.S. Cl. ............................. 179/1 CN; 330/124 R; 330/295; 179/1 AT

[58] Field of Search ............. 179/1 AT, 1 CN, 1 HF, 179/1 VL, 1 B, 1 MN; 330/124 R, 295

[56] References Cited

U.S. PATENT DOCUMENTS

| | | | |
|---|---|---|---|
| 3,439,121 | 4/1969 | Mitchell | 179/1 CN |
| 4,090,032 | 5/1978 | Schrader | 179/1 AT |

*Primary Examiner*—William C. Cooper
*Assistant Examiner*—E. S. Kemeny
*Attorney, Agent, or Firm*—Kinzer, Plyer, Dorn & McEachran

[57] ABSTRACT

A priority mixer control for a multi-microphone audio system comprises a threshold signal generator that develops a scanning D.C. threshold signal starting at a maximum level for a time T1 and then decreasing in amplitude as a function of time. Each microphone channel is provided with a control channel including a comparator that compares the microphone signal, as an A.C. signal, with the threshold signal, and that switches the microphone channel to "on" condition when the microphone signal exceeds the threshold; all of the control channels are coupled to a threshold signal restoration means that drives the threshold signal back to its maximum level each time an audio channel is switched "on". An audio channel that has been switched "on" remains "on" for a time T2 substantially longer than the time T1. The number of channels currently in "on" condition is continuously monitored and the output gain is reduced whenever two or more channels are in "on" condition.

14 Claims, 9 Drawing Figures

FIG. 2A.
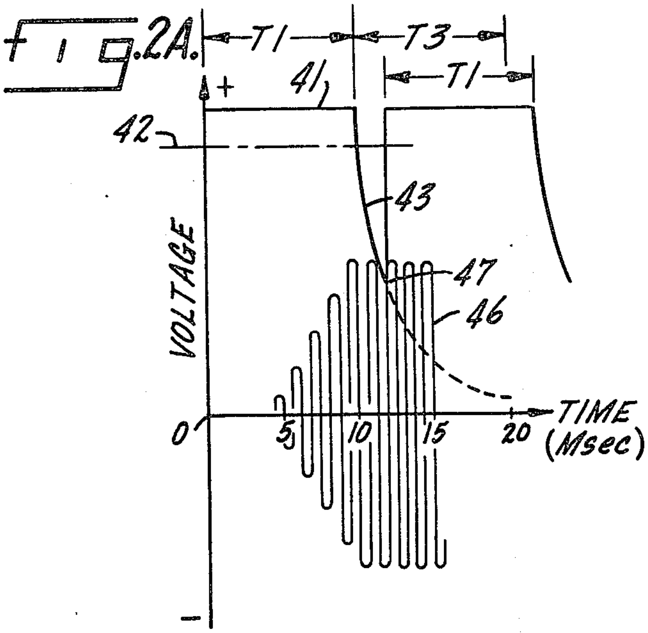
FIG. 2B.
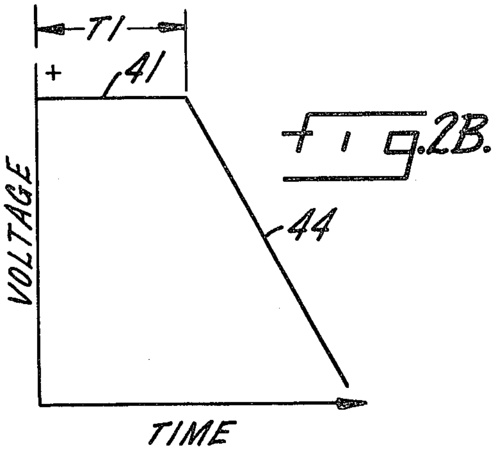
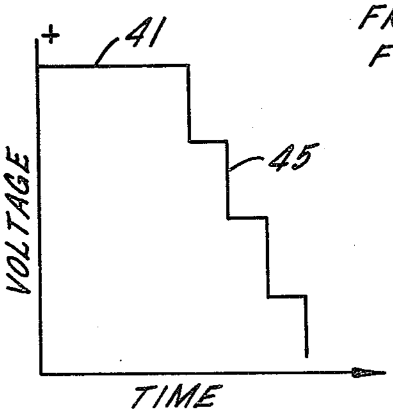
FIG. 2C.
FIG. 6.
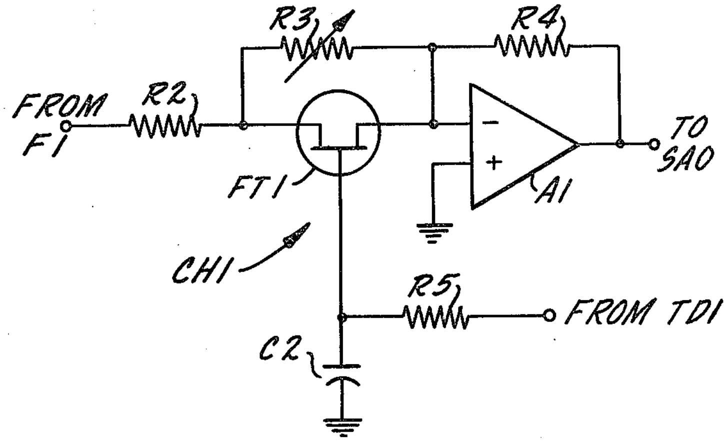
FIG. 7.
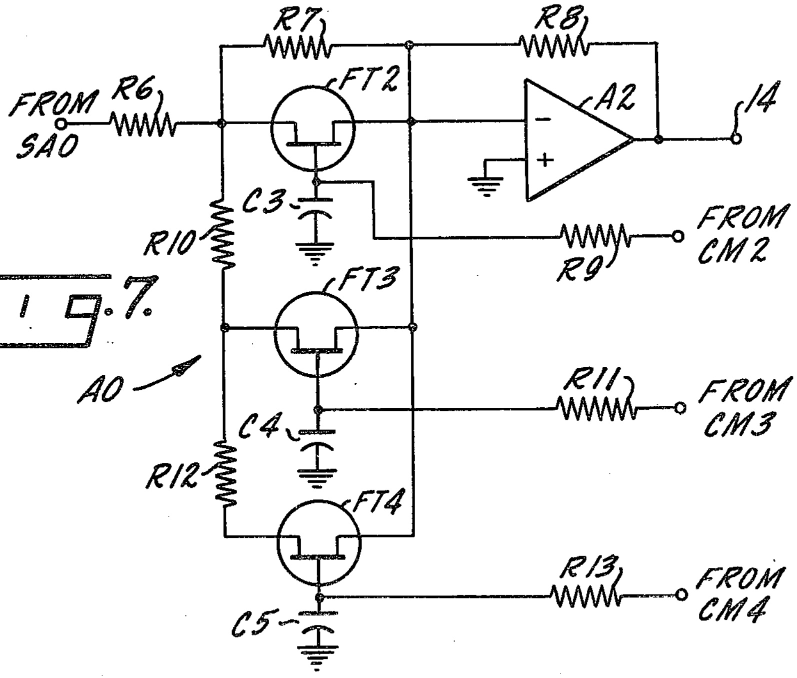

PRIORITY MIXER CONTROL

BACKGROUND OF THE INVENTION

There are a variety of applications for audio systems using a substantial number of microphones or similar audio signal sources. In the entertainment field, a plurality of microphones may be employed to cover a large stage area and, in some instances, portions of the audience. Another application for a multiple-microphone audio system is in the board room for a board having a large number of members. A legislative body affords another application.

In any such audio system, available acoustic gain must be limited to preclude the howling effect that can be produced by feedback. Using an ordinary mixer arrangement, with no priority control, a system incorporating ten microphones must be limited to 10 dB less gain than a single microphone system operating under the same conditions in order to prevent excessive feedback. That is, the addition of microphones to a system generally requires that the gain be reduced in accordance with the increased tendency toward feedback effects. A second drawback of an audio system utilizing a substantial number of microphones is the increased tendency toward pickup of undesirable background noise with subsequent amplification by the system.

Traditionally, systems incorporating substantial numbers of microphones have been operated at a marginally useful gain level. Alternatively, a technician has been employed to vary the gain of individual audio channels or of the entire system, judiciously fading microphones up and down as necessary.

Several different mixer controls have been proposed and utilized in an effort to improve upon the traditional arrangements for multiple microphone audio systems. Thus, a voice-operated microphone control can be used to limit the number of microphones that are effectively "on". In a system of this kind, for a given microphone to get "on" the voice level at the microphone must exceed a preset threshold. All microphones above the threshold are on and all below are held off. But the threshold setting is highly critical. If the threshold is set too low, background noise may turn one or more microphones on, producing undesirable amplified noise; if the threshold is set too high, persons who speak softly may be denied access to the system or may have their speech chopped. Moreover, if the system gain is set to accommodate one or two microphones on before feedback occurs, a loud sound may turn a number of microphones or even all microphones on and may latch them into a continuing feedback condition.

To avoid the latched feedback mode in voice-operated microphone systems, controls have been devised which operate to lock out all remaining microphones once a single microphone gains access to the system. In these controls, the microphones are usually scanned sequentially to find one that is above a given threshold. That microphone is then effectively turned "on", and is held "on" until its signal level drops below the threshold, at which time the control resumes its scan to find another microphone operating above threshold. This control provides maximum possible gain before feedback without fear of several microphones coming on. Its principal disadvantage is that conversations between two or more speakers are frequently chopped, particularly at the beginning of words or at the end of pauses. In conversational exchanges, when people frequently speak simultaneously or respond rapidly, noticeable word loss often occurs. Furthermore, the use of a high threshold may cause soft voices to be missed. Again, however, if the threshold is lowered, extraneous noise can interrupt the scan and prevent a bona fide active microphone from gaining access to the system.

Another modification of voice-operated controls, which allows two or more microphones to have access to the system simultaneously without increasing the danger of excessive feedback, is the NOM (number of open microphones) master gain attenuator. In a control of this kind, as additional microphones cross the threshold, the number of microphones currently "on" is counted and used to reduce the total system gain and avoid excessive feedback. Thus, if two microphones are "on" the gain is reduced by 3 dB; if ten microphones are "on," the gain reduction is 10 dB. This method allows multiple voice conversations with only transitory gain reductions, which are usually unnoticeable. However, the same threshold problems still persist. A low threshold allows many microphones "on," often due to background noise, with accompanying reduction of system gain, whereas a high threshold prevents weak voices from establishing access to the system.

In somewhat different controls, as presented in Dugan U.S. Pat. Nos. 3,814,856 and 3,992,584, the use of a preset threshold is eliminated. The relative output levels of the microphones are compared and system gain is apportioned to the microphones in accordance with their individual output levels. Thus, the microphone having the highest initial output level receives the most gain and the microphone having the lowest output receives the least gain. The overall gain of the system is held substantially constant to minimize feedback problems. Certain difficulties and disadvantages remain, however. If a soft voice and a loud voice are competing for use of the system, the louder voice tends to overshadow the softer voice disproportionately. Background noise is picked up and amplified in much the same manner as a standard mixer amplifier. Moreover, these controls require continuous comparison of the signals from the microphones over a very wide dynamic range, taxing the accuracy and stability of available circuits.

Another approach is presented in Nicholas et al U.S. Pat. No. 3,947,639 and Nicholas U.S. Pat. No. 3,958,084, directed to telephone conference systems. In those systems, one active source is selected for each conferee, based on amplitude, from all other conferees; the peak signal level for that active source establishes a variable reference which another source must exceed to become the new active source. The reference decays and is renewed on a fixed cyclic basis. These controls, like many voice-operated systems, are limited to one source "on," for each conferee, at any given time. Chopping remains a distinct possibility, and there is no way for any source to gain access to the system when a louder source is present.

SUMMARY OF THE INVENTION

It is a principal object of the present invention therefore, to provide a new and improved priority mixer control for a multiple-microphone audio system that effectively and inherently eliminates or minimizes the problems of the prior art as discussed above.

A further object of the invention is to provide a new and improved priority mixer control for a multiple-microphone audio system that allows the system to operate for one microphone on the same basis as if there were no additional microphones in the system without requiring the use of a preset threshold and that also accommodates two or more microphones on simultaneously without unduly favoring loud voices over softer voices.

Another object of the invention is to provide a new and improved priority mixer control for a multiple-microphone audio system that can accommodate two, three or even more microphones on simultaneously without noticeable dropouts and with effective automatic control of the overall system gain to preclude excessive feedback.

A particular object of the invention is to provide a new and improved priority mixer control for a multiple microphone audio system that exhibits improved performance characteristics, yet can be constructed with a minimum of inexpensive components of simple and reliable nature so that initial cost and maintenance costs are minimized.

Accordingly, the invention relates to a priority mixer control for an audio system of the kind comprising N audio sources each including a microphone and each developing an initial audio signal, N audio channels each connected to one audio source and each including channel amplifier means actuatable from a normal minimum-gain "off" condition to a maximum-gain "on" condition in response to a channel-on signal, and an output channel, including a summing amplifier for additively combining the outputs of all of the audio channels to develop a system output signal. The priority mixer control comprises threshold signal generator means for generating a D.C. threshold signal of given polarity having an amplitude which decreases from a fixed maximum level as a predetermined function of time. N control channels are provided, one for each audio channel; each control channel includes channel comparator means for comparing the threshold signal with the initial audio signal from its associated audio channel, in A.C. form, and timing means for generating a channel-on signal of predetermined duration T2 whenever excursions of the given polarity for that initial audio signal exceed the threshold signal, the channel-on signal being applied to the channel amplifier means in the associated audio channel. Threshold restoration means, coupled to all of the control channels and to the threshold signal generator, restore the threshold signal to its maximum level each time a channel-on signal is initiated.

DESCRIPTION OF THE DRAWINGS

FIGS. 2A through 2C illustrate alternative waveforms for a threshold signal employed in the priority mixer control of the invention;

FIG. 6 is a schematic diagram of a channel amplifier circuit, operating as an attenuator, for the control of FIG. 1; and FIG. 7 is a schematic circuit diagram of an amplifier circuit, functioning as an attenuator, for the output channel of the control of FIG. 1.

DESCRIPTION OF A PREFERRED EMBODIMENT

Figure 1:
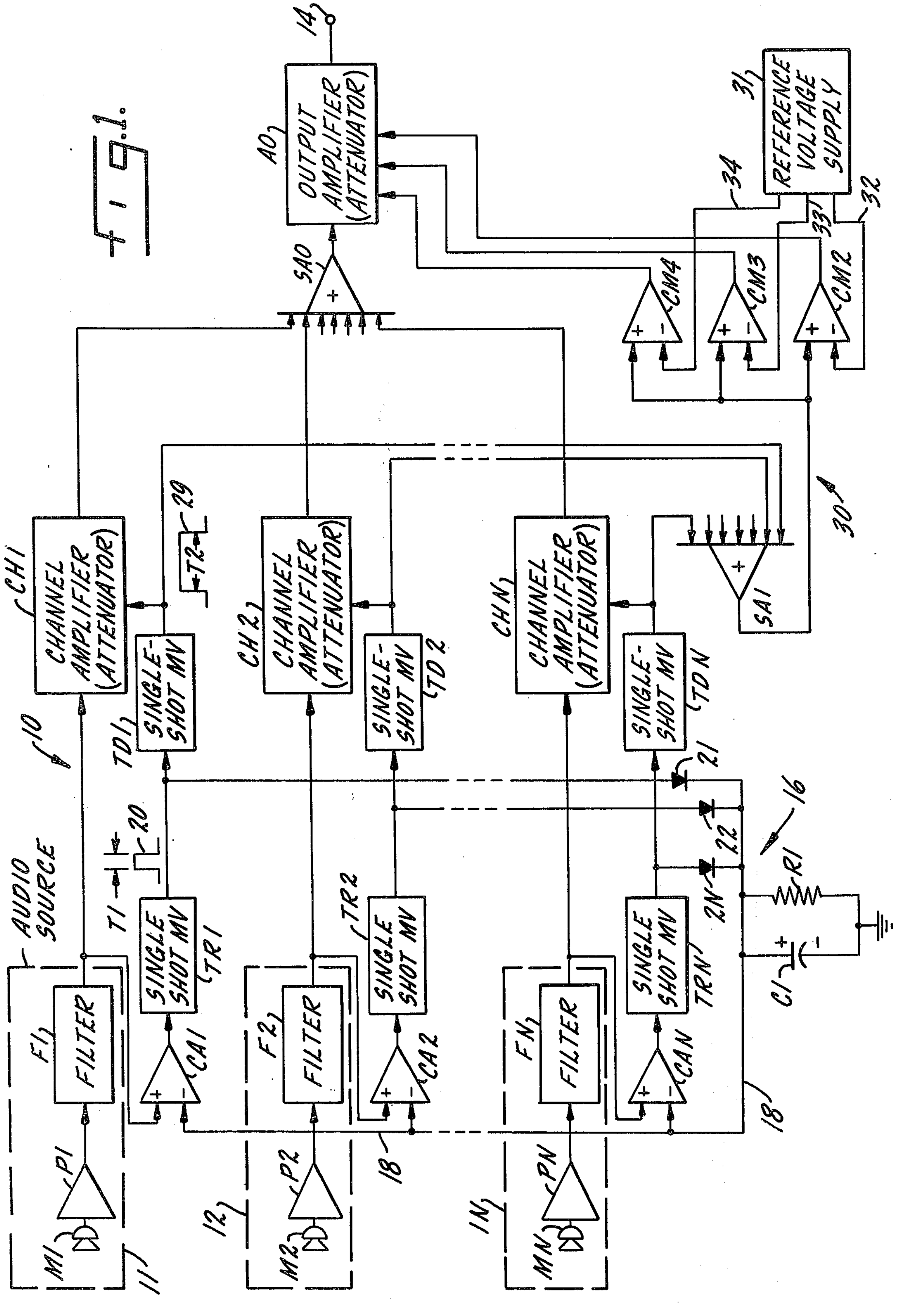
FIG. 1 is a block diagram of a multiple-microphone audio system incorporating a priority mixer control constructed in accordance with a preferred embodiment of the present invention.

FIG. 1 is a block diagram of an audio system 10 which incorporates a priority mixer control constructed in accordance with a preferred embodiment of the present invention. Audio system 10 includes a plurality of N individual audio sources. A first audio source 11 comprises a microphone M1 connected to a pre-amplifier P1 in turn connected to a speech filter F1. Typically, filter F1 is a band-pass filter having a range of 20 Hz to 20 Khz.

A second audio source 12, also shown in FIG. 1, comprises a microphone M2, a pre-amplifier P2, and a speech filter F2. A number of additional audio sources have been omitted, in FIG. 1, with the last audio source 1N being shown as comprising a microphone MN, a pre-amplifier PN, and a filter FN. The total number N of audio sources to be used in system 10, in any given application, is indeterminate. There may be as few as two audio sources in the system or as many as fifty or even more. For most applications, N is less than thirty.

Audio source 11 is connected to a first audio channel comprising a channel amplifier CH1. In the illustrated system, amplifier CH1 is an attenuator actuatable from a normal "off" condition to an "on" condition in response to an applied control signal. In a typical priority mixer control, particularly using a channel amplifier with the construction illustrated in FIG. 3, the gain of amplifier CH1 for its normal "off" condition is −20 dB or less, whereas for the "on" condition the gain may be zero dB. A switching circuit can be used, in the audio channel, as circuit CH1; in the following description and the claims any reference to a "channel amplifier" or "channel amplifier means" is intended to include a switching or gating circuit as well as an amplifier.

The output of audio source 12 is similarly connected to an audio channel comprising a channel amplifier CH2. The same construction is repeated for the other audio sources, ending with the source 1N which is connected to an audio channel comprising a channel amplifier CHN.

The audio system 10 of FIG. 1 further comprises an output channel including a mixer or summing amplifier SA0. The summing amplifier SA0 has a plurality of inputs, each connected to the output of one of the audio channels comprising the attenuator amplifiers CH1, CH2 . . . CHN. The output channel further includes an output amplifier A0. Amplifier A0, like amplifiers CH1, CH2, etc., functions as an attenuator. In this instance, however, the amplifier is actuatable to a plurality of successively lower reduced-gain conditions in response to a plurality of different gain control signals. Amplifier A0 is connected to an output terminal 14 which may be connected to additional amplifiers and to a suitable array of speakers or other sound reproducing devices.

The priority mixer control for audio system 10 includes a threshold signal generator means 16, described more fully hereinafter, which generates a D.C. threshold signal of given polarity having an amplitude which decreases from a fixed maximum level as a predetermined function of time. The threshold signal appears on a conductor 18 that is connected to one input of a channel comparator amplifier CA1 incorporated in a control channel associated with the audio channel for source 11. A second input to comparator CA1 is the initial audio signal developed by source 11. The output of comparator CA1 is connected to a first timing device comprising a single-shot trigger circuit TR1 producing an output signal 20 of duration T1.

The control channel for the first audio source 11 also includes a second one-shot trigger circuit TD1 having its input connected to the output of the single-shot TR1. Trigger circuit TD1 constitutes timing means for generating a "channel on" signal of predetermined duration T2 whenever excursions of the initial audio signal constituting the output from signal source 11 that are of the same polarity as the threshold signal supplied to amplifier CA1 on line 18 exceed the current threshold signal amplitude. The output of trigger TD1 is connected to the control input of channel amplifier CH1 to actuate that amplifier between its normal minimum-gain "off" condition and its alternate maximum-gain "on" condition.

The time interval T1 for the output pulse 20 of trigger circuit TR1 is much shorter than the time duration T2 for the output 29 of the second trigger circuit TD1. In addition to its connection to trigger circuit TD1, the output 20 of trigger TR1 is connected through a diode 21 to a capacitor C1 that is returned to a plane of reference potential, here shown as system ground. A resistor R1 is connected in parallel with capacitor C1. Diode 21, capacitor C1, and resistor R1 all constitute a part of the threshold signal generator 16.

Each of the remaining audio channels in system 10 is provided with a control channel similar in construction to that described above for the first audio channel comprising amplifier CH1. Thus, the input signal to the second audio channel, derived from source 12, is applied to a comparator amplifier CA2 that also receives the threshold signal on conductor 18 as a second input. The output of amplifier CA2 is connected to a single-shot trigger circuit TR2 that is in turn connected to a second single-shot trigger circuit TD2 which has a "channel on" output connected to the control input of the audio channel amplifier CH2. For the audio channel of source 1N, the control channel comprises a comparator amplifier CAN, a first one-shot trigger circuit TRN, and a second one-shot trigger circuit TDN. The outputs of trigger circuits TR2 and TRN are also connected to two diodes 22 and 2N, respectively, that constitute a part of the threshold signal generator 16.

The priority mixer control of FIG. 1 also includes monitoring means 30 for generating a series of gain control signals employed to control the operation of output amplifier A0. Monitoring means 30 comprises a summing amplifier SA1 having a plurality of inputs. One input to amplifier SA1 is connected to the output of the single-shot trigger circuit TD1 in the first audio control channel. Another input to amplifier SA1 is taken from trigger circuit TD2 in the control channel for the second audio signal. Similar connections are provided for the remaining channels, ending with a connection from trigger circuit TDN to one of the inputs of summing amplifier SA1.

Monitoring means 30 also comprises a reference voltage supply 31 having three outputs 32, 33, and 34. The voltage on output 32 is of constant amplitude, slightly less than twice the amplitude of the output signals 29 from the channel-on timing circuits TD1, TD2 . . . TDN. The output on line 33 is a voltage of constant amplitude, slightly less than three times the channel-on output signal amplitude. The output on line 34 is a constant voltage having an amplitude slightly lower than four times the channel-on signal amplitude.

In monitoring means 30, there are three comparator amplifiers CM2, CM3 and CM4. Comparator CM2 has one input connected to output 32 of the reference supply 31 and a second input connected to the output of summing amplifier SA1, and produces a gain control signal whenever two of the audio channels in system 10 are in their "on" condition. The inputs to monitor amplifier CM3 are taken from amplifier SA1 and from the reference output 33; comparator CM3 produces an output signal whenever three audio channels are in the "on" condition. Monitor amplifier CM4 derives its inputs from amplifier SA1 and from reference output 34 and generates a gain control signal whenever four or more audio channels are in the "on" condition. The gain control signals developed by comparators CM2, CM3 and CM4 are all applied to attenuator amplifier A0 to control overall system gain.

Before reviewing the operation of audio system 10 and the priority mixer control shown therein, some consideration of threshold signal generator 16 and the nature of the threshold signal developed by circuit 16 is desirable. Each time one of the single shot trigger circuits TR1, TR2, . . . TRN produces an output signal 20, that signal is applied through one of the diodes 21, 22, . . . 2N to charge capacitor C1 to a fixed maximum level 41 (FIG. 2A). This maximum threshold level 41 is preferably somewhat higher than the maximum amplitude 42 for the initial audio signals developed by the signal sources 11, 12 . . . 1N of the system. The charge on capacitor C1 and, accordingly, the voltage on line 18, is maintained at the maximum level 41 throughout the time interval T1 for the output signal 20 from the control channel. At the end of time T1, however, capacitor C1 begins to discharge rapidly through resistor R1 (FIG. 1). Consequently, the threshold signal decreases in amplitude as a predetermined function of time, as shown by the curve 43 in FIG. 2A. Preferably, the rate of discharge for capacitor C1 is relatively high so that the threshold signal approaches zero in a time period T3 that is equal to or less than interval T1.

It is not essential, though it is preferable, that the threshold signal follow an exponential curve like the curve 43 in FIG. 2A. Thus, the threshold signal generator means 16 can be modified to afford a linear ramp signal 44 as the threshold signal, as shown in FIG. 2B. Yet another possible variation is a step form decreasing threshold signal 45 as shown in FIG. 2C. However, it is essential to effective operation of the present invention that the threshold signal have an amplitude which decreases from the maximum threshold level 41 as a function of time, whether the waveform be of the type represented by curves 43, 44 and 45, or of some other configuration.

In considering the operation of audio system 10 and the priority mixer control incorporated in that system, it may first be assumed that only the one microphone M1 is in use and produces an initial audio signal as generally indicated by signal 46 in FIG. 2A. That initial audio signal, the output from source 11, is continuously compared with the exponential ramp threshold signal 41,43 (FIG. 2A) in the channel comparator CA1 (FIG. 1). At a given instant represented in FIG. 2A by point 47, a positive peak of signal 46 exceeds the ramp portion 43 of the threshold signal. When this occurs, comparator CA1 (FIG. 1) generates an output signal which actuates the first single-shot multivibrator TR1, producing an output signal 20 that in turn actuates the second trigger circuit TD1 in the control channel. Circuit TD1 produces a "channel-on" signal 29 of predetermined duration T2 which is applied to the audio channel amplifier CH1 and actuates that amplifier from its normal minimum-gain "off" condition to a maximum-gain "on" condition. In this manner, microphone M1 effectively gains access to the output channel, through amplifier CH1 to amplifier SA0 and amplifier A0. This operating condition for the audio channel of source 11 is maintained for the duration T2 of the channel-on signal 29; in a typical installation, time T2 may be of the order of 200 milliseconds, though substantial variation is permissible.

The first trigger circuit TR1 in the control channel functions as a threshold restoration means for restoring the threshold signal from threshold signal generator 16 to its maximum level. Thus, the output signal 20 from trigger circuit TR1 is supplied, through diode 21, to capacitor C1, charging the capacitor. As noted above, capacitor C1 is charged to a level exceeding the maximum positive-polarity peak output from any of the microphones. Capacitor C1 is again held at its maximum charge (level 41 in FIG. 2A) for the full time interval T1 of signal 20; in a given system time T1 may be of the order of ten milliseconds. With the charge on capacitor C1 at maximum, all of the remaining microphones are denied access to the output channel SA0, A0. Thus, all audio signal channels are prevented from actuation to "on" condition for at least ten milliseconds.

After the first trigger circuit TR1 times out, and signal 20 ends, resistor R1 bleeds capacitor C1 so that the threshold signal decreases in amplitude in accordance with the exponential ramp 43 shown in FIG. 2A. Preferably, the time constant for the circuit R1,C1 is much smaller than the interval T1. Typically, the time constant may be approximately one millisecond, for a time T1 of ten milliseconds, so that the ramp portion 43 of the threshold signal covers a range of approximately 80 dB in a ten millisecond inerval T3. However, with the microphone M1 still active, the ramp is not completed since the microphone signal 46 again has a positive peak that exceeds the amplitude of the ramp approximately at point 47. When this occurs, the first trigger circuit TR1 again restores the threshold signal generator 16 to its maximum level and retriggers the second one-shot circuit TD1, resetting the first audio channel to "on" condition for another period T2 of 200 milliseconds.

Consider now the situation in which a second person begins to speak, at microphone M2. There is a high probability that the second microphone can gain access to the output channel of the system, due to the alternating current nature of the comparison carried out in the comparator amplifiers CA1 and CA2 and illustrated in FIG. 2A, even if microphone M1 remains active and the two microphones produce signals of equal amplitude. Thus, as shown in FIG. 2A, the signal 46 from microphone M1 in signal source 11 is negative fifty percent of the time; during each negative half-cycle of signal 46 an intervening signal from another microphone can go positive, exceeding ramp 43 and actuating the second audio signal channel to its "on" condition. Of course, if the signal from microphone M2 is of greater amplitude than that from microphone M1, the access opportunities are improved. Even a lower amplitude signal from microphone M2 will frequently gain system access. Furthermore, during any pause in the speech in the person using microphone M1, a person using microphone M2 can gain access to the system, even though microphone M1 remains "on." Thus, the first update by virtue of the rapid ramp decay time and the random nature of speech combine to readily allow two talkers to share system 10 without noticeable chopping of sounds.

With two audio signal channels both in "on" condition, the output from summing amplifier SA1 (FIG. 1) is twice the amplitude of one of the channel-on signals 29, and the input to monitor amplifier CM2 from amplifier SA1 exceeds the reference input 32. As a consequence, monitor CM2 produces a gain control output signal indicative of two audio signal channels in the "on" condition. That gain control signal is applied to amplifier A0 to reduce overall gain by 3 dB and thus maintain feedback stability for system 10.

Actually, it is quite possible for system 10, with the illustrated priority mixer control, to operate with three, four, or even more audio signal channels in the "on" condition. Whenever three audio channels are "on," comparator CM3 produces a gain control signal that is applied to amplifier A0 to set the output attenuation to −6 dB. Similarly, if four or more audio signal channels are in "on" condition, a signal from monitor CM4 to output amplifier A0 establishes a total of 9.2 dB attenuation as the overall gain condition for system 10.

From the foregoing description, it is seen that the priority mixer control of audio system 10 effectively examines all of the audio sources 11, 12 . . . 1N at a series of time intervals of varying duration always less than twenty milliseconds (assuming T1+T3=twenty milliseconds), seeking initial audio signals that instantaneously exceed the threshold ramp signal from circuit 16. The first audio source that exceeds the threshold is assigned full access to the output channel of the system for a time T2 of 200 milliseconds. If only one microphone is active, access is extended at intervals of less than twenty milliseconds. Thus, the one microphone receives the benefit of full system gain on a full-time basis.

If the first signal source becomes inactive and a second is rendered active, as when the person talking changes location or when a second person begins to talk, the second microphone gains full access to the output channel of the system in a time interval of less than twenty milliseconds. If two persons are speaking simultaneously on two different microphones, each microphone will be updated for access approximately every forty milliseconds. This is more than adequate to assure that both are kept on, since each update insures 200 milliseconds of "on" time. To insure an adequate margin of protection against excessive feedback, the gain in the output channel is reduced by 3 dB whenever any two microphones are on simultaneously.

If two persons are speaking simultaneously, one in a soft voice, and one in a loud voice, they receive nearly equalized likelihood of access to the output channel of the system, because only positive audio signal levels are compared with the threshold signal. Thus, during negative excursions of any of the initial audio signals from the different microphones, which occupy one-half of the available time, a weaker signal from a second source has full opportunity for access to the system.

When several different people vie for access to the system the probability of all managing to obtain access decreases. This effectively limits the maximum possible number of audio signal channels that can be "on" at any given time. For example, if ten talkers start out simultaneously, a probability analysis shows that each will be "on" approximately 88% of the time. Thus, the priority mixer control of FIG. 1 effectively "time shares" the system gain when a large number of people attempt to use the system simultaneously. In practice, this is not really a detrimental limitation on effective operation because if several persons speak simultaneously, none can be understood anyway.

Figure 3:
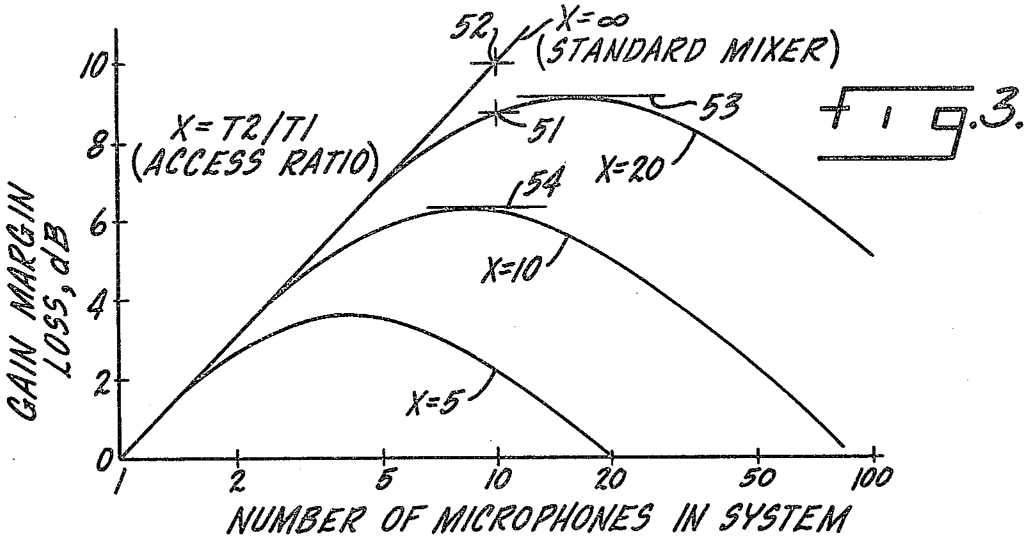
FIGS. 3–5 are charts of operating relationships employed to explain the characteristics of the priority mixer control of the invention.

FIG. 3 illustrates the effect of the time sharing properties of the priority mixer control in relation to loss of gain margin as a function of the number of microphones in a given audio system. Curves are provided for access ratios (defined as X=T2/T1) of five, ten, and twenty, and for a standard mixer which would have an access ratio of infinity. As shown by points 51 and 52 in FIG. 3, with an access ratio of twenty for which ten microphones can be "on" only 88% of the time, there is an improvement of 1.2 dB in gain margin due to this time sharing effect. The improvement becomes even greater as the number of microphones increases.

The peak level of the curve for an access ratio of twenty in FIG. 3 also makes it apparent that the reduction in overall system gain does not need to exceed 9.2 dB to insure stability for any number of microphones in the system. Consequently, effective operation of the system is quite possible with only a limited number of steps of gain reduction for amplifier A0 while still maintaining effective feedback stability. For a lower access ratio of ten the peak level for the curve in FIG. 3 indicates that only a total of 6.3 dB in gain reduction is required for assured stability. As might be expected, the level is even lower for an access ratio of five; however, this reduction in the access ratio may produce chopping in some instances.

With an access ratio of twenty, as in the specific arrangement described above for the audio system 10 of FIG. 1, a gain reduction of 3 dB is quite adequate for two microphones "on." An additional gain reduction of 3 dB for three audio signal chanels "on" and a further gain reduction of 3.2 dB for five or more audio channels in "on" condition insures stable system performance for any number of total microphones.

Figure 4:
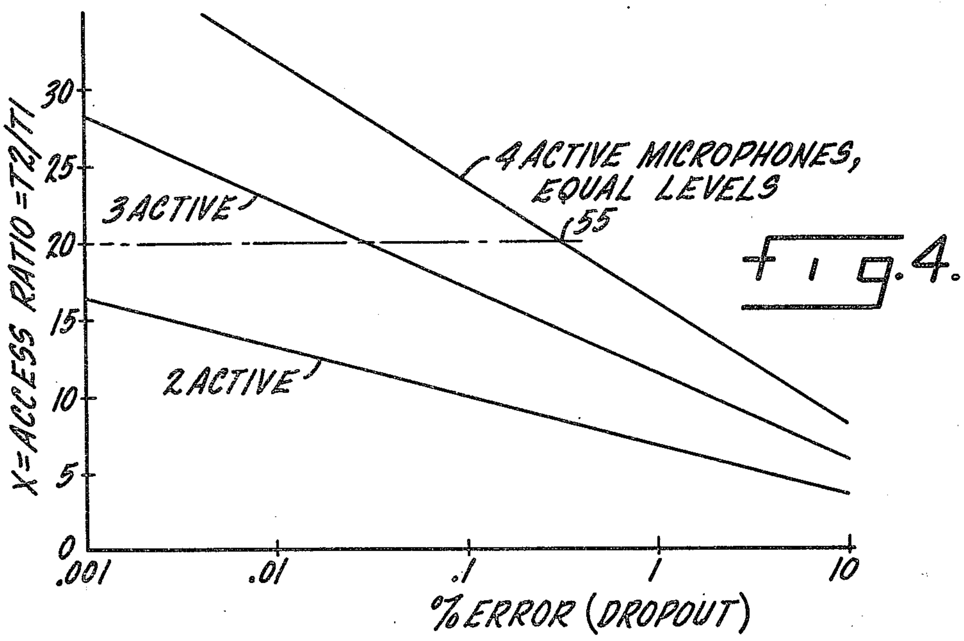

FIG. 4 is a plot of the access ratio T2/T1 as a function of the percent error or likelihood of dropout due to the time sharing properties of the priority mixer control. With four competing microphones active (assuming output signals of essentially equal amplitude) it is seen that for an access ratio of twenty the error rate is approximately 0.3% as indicated at point 55 in FIG. 4. With three microphones active, on the same assumption, the error rate is reduced to approximately 0.03%. For this particular access ratio, with only two active microphones, the percent error is off the scale to the left and works out to about 0.0003%. Rates below 0.3% are usually unnoticeable in speech.

Figure 5:
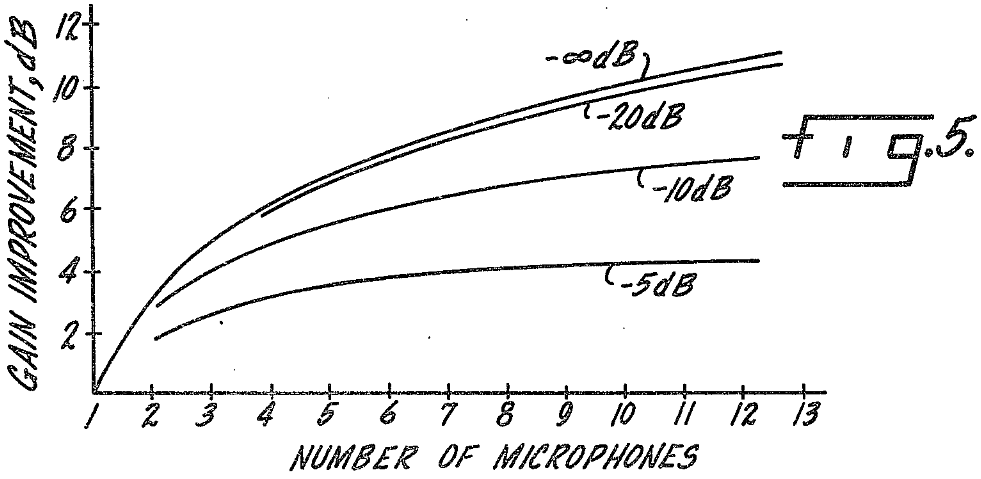

FIG. 5 illustrates the gain improvement of the present invention over a standard mixer as a function of the number of microphones in a given audio system, for various levels of attenuation for the "off" condition of the channel amplifiers CH1, CH2 . . . CHN, ranging from infinity to only −5 dB. It is noticeable that an attenuation of −20 dB for the "off" condition is almost the same as an open-switch (infinite attenuation) arrangement. For attenuations of −10 dB and −5 dB, substantially less improvement is realized. But in certain situations (e.g. a chairman's microphone or a pulpit microphone) a smaller attenuation or even zero attenuation for the "off" condition may be desirable.

FIG. 6 illustrates a specific circuit that may be utilized in the system of FIG. 1 for the audio channel amplifiers CH1, CH2, . . . CHN. Circuit CH1, as shown in FIG. 6, comprises an input resistor R2 connected to one main electrode of a field effect transistor FT1, the other main electrode of the transistor being connected to the negative input of an operational amplifier A1. The plus input of amplifier A1 is connected to system ground. The base of transistor FT1 is connected to an integrating circuit comprising a resistor R5 that is connected to the output of trigger circuit TD1 and a capacitor C2 that is returned to system ground. The output of amplifier A1 is connected to one input of the summing amplifier SA0 (FIG. 1). A feedback resistor R4 is connected from the output of amplifier A1 back to the negative input. A variable resistor R3 is connected between resistors R2 and R4.

Typically, the control inputs to circuits CH1, FIG. 6, through resistor R5, may be established as −15 volts for the normal "off" condition of this channel amplifier circuit and zero volts as the channel-on control signal 29 from the single shot circuit TD1. Resistor R4 is made equal to resistor R2. For the "on" condition of the circuit, the overall gain of the amplifier is zero dB. For the "off" condition, the gain is a function of the setting of the resistor R3. For example, if R2 and R4 are selected as ten kilohms and R3 is set to a value of ninety kilohms, the gain for the "off" condition is −20 dB. The utilization of an integrating circuit such as the circuit R5, C2 in the control input to amplifier CH1 is not essential but is preferred to prevent coupling of switching transients through transistor FT1 into the audio channel. The integrator R5, C2 also provides smooth "on" and "off" action for the circuit. A suitable transistor for the circuit of FIG. 6 is a Type 2N4393; an appropriate operational amplifier is Type LF355. Both provide low noise and low distortion. With these components, R2 and R4 may be 10 kilohms each, and R3 a potentiometer of 0–100 kilohms.

FIG. 7 illustrates a suitable operating circuit for the output amplifier or attenuator A0 of FIG. 1. The upper portion of the circuit is essentially the same as the circuit of FIG. 6, comprising an input resistor R6, a field effect transistor FT2, an operational amplifier A2, and an integrating control input for the transistor base including a resistor R9 and capacitor C3. A feedback resistor R8 for amplifier A2 and a resistor R7 interconnecting resistors R6 and R8 complete the initial portion of the circuit.

In the circuit A0 of FIG. 7, a resistor R10 connects the input resistor R6 to one electrode of a second field effect transistor FT3 that has an output electrode connected to the negative input of amplifier A2. In this instance the control input to the transistor base comprises an integrating circuit including a resistor R11 and a capacitor C4. A similar circuit is provided for an additional input control transistor FT4, including a coupling resistor R12 and a control input circuit including a resistor R13 and capacitor C5.

The specific circuit A0 as shown in FIG. 7 provides an overall gain of zero dB when no gain control inputs are received on any of the control input circuits. With a gain control signal available from comparator CM2, indicating two audio channels are active, the gain is −3 dB. When an additional input is received from comparator CM3, representative of three active audio channels, the gain drops to −6 dB. When there are gain control inputs from all of the comparators CM2–CM4, the overall gain for circuit A0 is about −9.2 dB. As in the case of the circuit shown in FIG. 6, the control inputs are slowed down by integration to afford a smooth on/off operation for the attenuator amplifier. The FETs and operational amplifier can be the same as noted for FIG. 6. Resistor values may be R6 and R8, ten kilohms, R7 and R12, fifteen kilohms, R10, 5.6 kilohms.

A number of variations are possible in the priority mixer system of the present invention. For example, it is not essential that the threshold signal timing circuits (TR1) precede the channel-on timing circuits (TD1) in the control channels for the individual audio channels. Instead, the channel-on circuits TD1 can be actuated directly from the comparator amplifier CA1. With this arrangement, the timing circuit TR1 that produces the short threshold restoration pulse 20 can be actuated from the channel-on output of trigger circuit TD1. As will be apparent from the foregoing description, the basic function of the monitoring circuit 30 is to maintain a count of the number of audio channels presently in the "on" condition and to utilize that count to generate appropriate gain control signals for the output amplifier or attenuator A0. Consequently, suitable digital counting circuits can be used for this purpose instead of the comparator circuits actually illustrated in FIG. 1.

In some installations, it may be desirable to provide one or more microphones with full, unrestricted access to the system. This is readily accomplished, in the system of FIG. 1, with the channel amplifier construction CH1 shown in FIG. 6, by adjustment of resistor R3 to a minimal value, or even to zero. Setting R3 to zero establishes a normal "off" gain of zero dB, the same as for the "on" condition of the channel amplifier. A microphone for the chairman of a meeting is a good example of an application that may find this modification desirable, as noted above. Furthermore, even with the "off" attenuation for one or more channel amplifiers set to zero, with priority mixer control still affords an indication of the status of each channel; appropriate indicator lamps can be actuated from the outputs of the channel-on trigger circuits TD1, TD2 . . . TDN. An arrangement of this kind can be useful in a count or other environment where speaker identification is important but feedback suppression is not critical.

In a given application, it may be desirable to have the system arranged so that any audio source is assured access to the output channel of the system whenever the person addressing the microphone for that source demands recognition in a loud voice. This can be accomplished in the system of FIG. 1 by adjusting the amplitude of the restoration signals 20, as supplied to the threshold signal generator 16, so that the maximum threshold level 41 is just slightly below the peak positive amplitude level 42 for the initial audio signals (FIG. 2A). With this modification, a really loud voice at any microphone gives immediate access to the system, whereas for ordinary speech levels the overall system operation may remain as described above.

I claim:

1. A priority mixer control for an audio system of the kind comprising N audio sources each including a microphone and each developing an initial audio signal, N audio channels each connected to one audio source and each including channel amplifier means actuatable from a normal minimum-gain "off" condition to a maximum-gain "on" condition in response to a channel-on signal, and an output channel, including a summing amplifier for additively combining the outputs of all of the audio channels to develop a system output signal, the priority mixer control comprising:

threshold signal generator means for generating a D.C. threshold signal of given polarity having an amplitude which decreases from a fixed maximum level as a predetermined function of time;

N control channels, one for each audio channel, each control channel including channel comparator means, for comparing the threshold signal with the initial audio signal from its associated audio channel, in A.C. form, and timing means for generating a channel-on signal of predetermined duration T2 whenever peak excursions of the given polarity for that initial audio signal exceed the threshold signal, the channel-on signal being applied to the channel amplifier means in the associated audio channel; and threshold restoration means, coupling all of the control channels to the threshold signal generator, for restoring the threshold signal to its maximum level each time a channel-on signal is initiated.

2. A priority mixer control according to claim 1, in which the threshold signal generator maintains the threshold signal at its maximum level for a predetermined time interval T1 on each restoration, before the threshold signal begins to decrease, and in which T2>T1.

3. A priority mixer control according to claim 2, in which the maximum threshold level exceeds the maximum peak output amplitude of any of the audio signal sources, so that no additional audio channels can be actuated to "on" condition during any time interval T1.

4. A priority mixer control according to claim 2 in which the access ratio T2/T1 is in the range of five to forty.

5. A priority mixer control according to claim 2 in which the threshold signal generator means comprises an R-C circuit including a capacitor, charged to the maximum threshold level throughout the time interval T1, and a bleed resistor connected to the capacitor, so that the threshold signal is an exponential ramp function.

6. A priority mixer control according to claim 5 in which the time constant of the R-C circuit in the threshold signal generator means is substantially smaller than the time interval T1.

7. A priority mixer control according to claim 2, in which the output signal channel includes output amplifier means actuatable from a normal maximum-gain condition to a reduced-gain condition in response to a gain control signal, the mixer control further comprising:

monitoring means, including a monitoring circuit coupled to all of the audio channels, for generating a gain control signal whenever a predetermined number of audio channels are in their "on" condition, and applying that gain control signal to the output amplifier means.

8. A priority mixer control according to claim 7, in which the output amplifier means is actuatable to a plurality of successively lower reduced-gain conditions in response to a plurality of gain control signals, and in which the monitoring means includes means for generating a corresponding plurality of gain control signals each indicative of a different number of audio channels in "on" condition.

9. A priority mixer control according to claim 8, in which the monitoring means comprises:

a summing circuit for additively combining the channel-on signals from all of the control channels to generate a monitor signal having an amplitude representative of the total number of channels in "on" condition;

monitor reference means for generating a plurality of reference signals each having a constant amplitude slightly less than the sum of a given number of channel-on signal amplitudes, the number being different for each reference signal;

and a corresponding plurality of gain monitors, each gain monitor comprising a comparator comparing the output of the summing circuit with one of the reference signals to develop a gain control signal whenever the output of the summing circuit exceeds the reference signal supplied to that monitor.

10. A priority mixer control according to claim 9 in which the access ratio T2/T1 is about twenty, in which the monitor reference means generates three reference signals having amplitudes slightly less than the sums of two, three, and four channel-on signal amplitudes respectively, in which there are three monitors generating two-on, three-on, and four-on gain control signals, respectively, and in which the successive reduced-gain conditions for the output amplifier means are approximately −3 dB, −6.0 dB and −9.2 dB respectively.

11. A method of priority and mixing control for an audio system of the kind comprising N audio sources each including a microphone and each developing an initial audio signal, N audio channels each connected to one audio source and actuatable from a normal minimum-gain "off" condition to a maximum-gain "on" condition in response to a channel-on signal, and an output channel, including a mixer amplifier for additively combining the outputs of all of the audio channels to develop a system output signal, comprising the steps of:

developing a D.C. threshold signal of given polarity having an amplitude maintained at a maximum level for a predetermined time interval T1 and subsequently decreasing to near zero during a subsequent time interval T3, where T1 and T3 are of the same order of magnitude;

for each audio channel, continuously comparing the threshold signal with the initial audio signal in A.C. form to determine whether a crossover of the peak excursions of the initial audio signal and the threshold signal occurs;

actuating each audio channel to its "on" condition upon occurrence of a crossover for that channel, for a time interval T2, with T2>T1;

and restoring the threshold signal to its maximum level each time a crossover occurs for any channel.

12. The method of priority and mixing control for an audio system, according to claim 11, including the following additional steps:

monitoring the audio system to determine the number of audio channels in "on" condition;

and decreasing the gain of the output channel in a limited number of discrete steps in accordance with the number of channels in "on" condition, up to a maximum of four channels "on".

13. A method of priority and mixing control for an audio system, according to claim 12, in which the access ratio T2/T1 is about twenty, and in which the steps of gain decrease are of the order of −3 dB, −6.0 dB, and −9.2 dB for two, three, and four channels in "on" condition, respectively.

14. A method of priority and mixing control according to either of claims 11 or 12, in which the maximum threshold level exceeds the maximum peak output amplitude of any of the audio signal sources, so that no additional audio channels can be actuated to "on" condition during any time interval T1.

* * * * *